United States Patent [19]
Meurisse et al.

[11] Patent Number: 5,848,056
[45] Date of Patent: Dec. 8, 1998

[54] METHOD TO ESTIMATE THE CURRENT DATAPACKET RATE OF A VIRTUAL CONNECTION, A FEEDBACK MECHANISM USING SAID METHOD AND DEVICE, SWITCHING NODE AND DESTINATION NODE REALIZING SAID METHOD

[75] Inventors: Wim Pol Meurisse, Harelbeke; Rudy Georges Hoebeke; Guido Henri Marguerite Petit, both of Antwerp; Gert Van der Plas, Merchtem, all of Belgium

[73] Assignee: Alcatel Alsthom, Compagnie Generale D'Electricite, Paris, France

[21] Appl. No.: 821,649

[22] Filed: Mar. 20, 1997

[30] Foreign Application Priority Data

Mar. 20, 1996 [EP] European Pat. Off. .............. 96200777

[51] Int. Cl.⁶ .................................................. H04Q 11/04
[52] U.S. Cl. ........................................... 370/232; 370/252
[58] Field of Search ..................................... 370/230, 232, 370/233, 234, 235, 252, 253, 412

[56] References Cited

U.S. PATENT DOCUMENTS

| | | | |
|---|---|---|---|
| 5,029,164 | 7/1991 | Goldstein et al. ....................... | 370/235 |
| 5,119,367 | 6/1992 | Kawakatsu et al. ..................... | 370/232 |
| 5,515,359 | 5/1996 | Zheng ..................................... | 370/231 |
| 5,633,859 | 5/1997 | Jain et al. ............................... | 370/234 |

FOREIGN PATENT DOCUMENTS 0671860  9/1995  European Pat. Off. .

OTHER PUBLICATIONS

"Admission Control and Routing in ATM Networks Using Inferences from Measured Buffer Occupancy" by Courcoubetis et al, IEEE Trans. Feb./Apr., Nos. 2/4, pp. 1778–1784.
"Intelligent Congestion Control for ABR Service in ATM Networks" by Siu, et al. Computer Communication Review, No. 5, NY, pp. 81–106.
"The Rate–Based Flow Control Framework for the Available Bit Rate ATM Service", by Bonomic et al, IEEE Network, Mar./Apr. 1995, pp. 25–39.
ATM Forum Traffic Management Specification Version 4.0 with Reference ATM Forum 95–0013R10 published by Shirish S. Sathaye Fore Systems, Inc. Feb. 5–9, 1996.

*Primary Examiner*—Chau Nguyen
*Assistant Examiner*—Kenneth Vanderpuye
*Attorney, Agent, or Firm*—Ware, Fressola, Van Der Sluys & Adolphson LLP

[57] ABSTRACT

A method is described to estimate the current datapacket rate $CCR_i$ called herein current cell rate, of a connection out of a plurality of connections which are carrying datapackets via a multiplexed transmission channel in a communication network. The method includes the steps of storing in a buffer (B) incoming datapackets of the connections, determining the total number of datapackets $BC_{TO}$ in the buffer (B), determining the number of datapackets of the connection $BC_i$ in the buffer (B), measuring an aggregate input datapacket rate $C_{IN}$ of the buffer and estimating the current datapacket rate $CCR_i$ via the formulae:

$$CCR_i = C_{IN} \cdot \frac{BC_i}{BC_{TO}}.$$

13 Claims, 1 Drawing Sheet

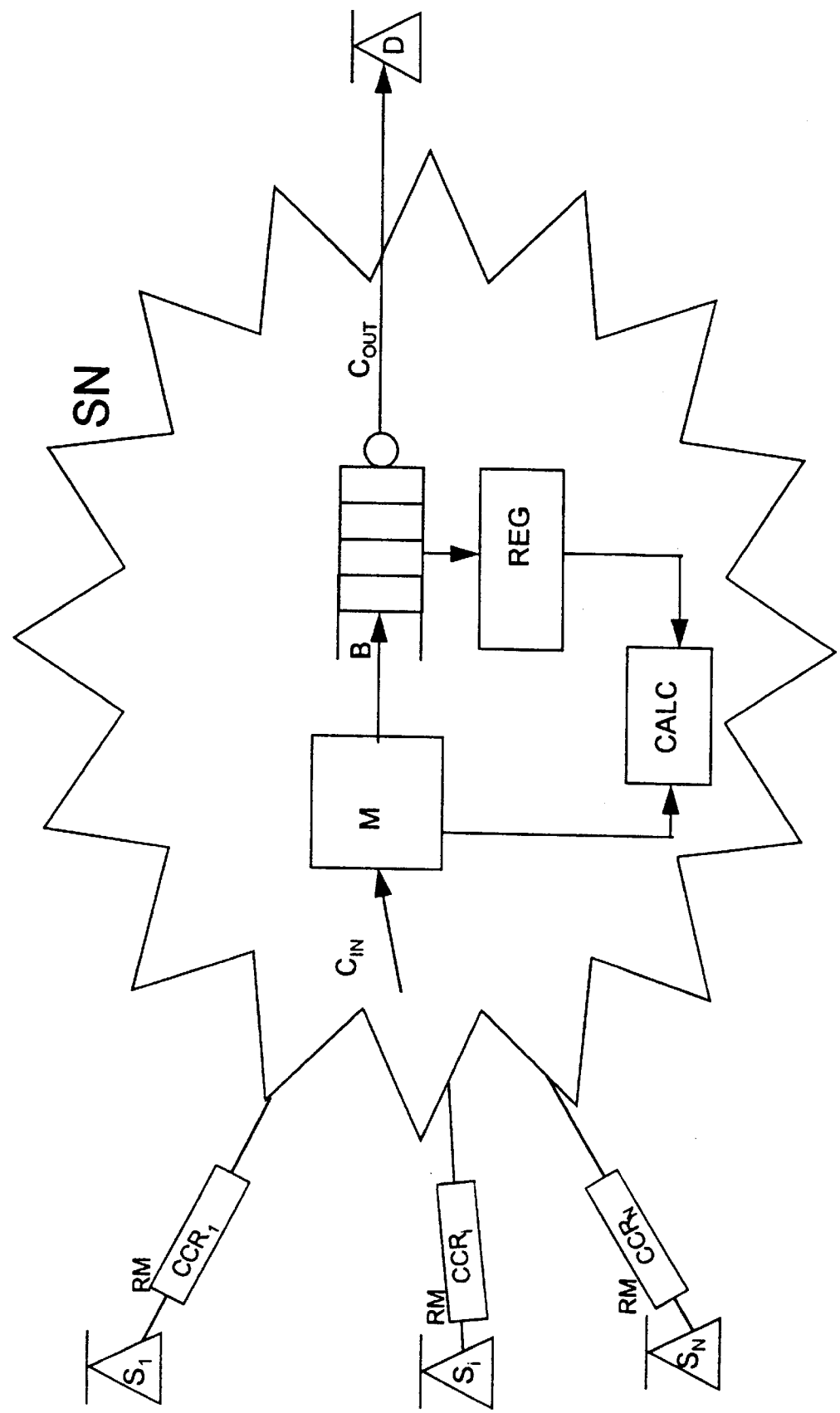

METHOD TO ESTIMATE THE CURRENT DATAPACKET RATE OF A VIRTUAL CONNECTION, A FEEDBACK MECHANISM USING SAID METHOD AND DEVICE, SWITCHING NODE AND DESTINATION NODE REALIZING SAID METHOD

TECHNICAL FIELD

The present invention relates to a method to estimate the current datapacket rate of a connection out of a plurality of connections carrying datapackets and using a multiplexed transmission channel in a communication network, to a feedback mechanism using such a method, a device realizing such a method, and switching nodes and destination nodes including this device.

BACKGROUND OF THE INVENTION

Such a method and device realizing the latter are already known in the art e.g. from the published "European patent application EP 0422550 A1 910417 entitled Device for evaluating the rate of virtual circuits in an asynchronous time multiplex transmission path" wherein the incoming cells of an input asynchronous time division multiplexed transmission channel, i.e. datapackets, are counted by a counter assigned to each virtual connection which is incremented with each incoming cell of the virtual connection and which is periodically decremented.

SUMMARY OF THE INVENTION

An object of the present invention is to provide a method and device of the above known type but which estimates the current datapacket rate of connections in an alternative way.

In the following paragraphs the so called cells and current cell rate of a connection are equivalent to the datapackets and current datapacket rate of a connection.

According to the invention this object is achieved by a method to estimate in a node of a communication network in the current datakpacket rate $CCR_i$ of one out of a plurality of connections passing through or arriving at the node and carrying datapackets transmitted via a multiplexed transmission channel in the communication network, characterised in that the method comprises the steps of storing in a buffer of the node incoming datapackets of the connections; determining the total number of datapackets in the buffer; determining the number of datapackets of the connection in the buffer; measuring an aggregate input datapackets rate of the buffer; and estimating the current datapacket rate via the equation:

$$CCR_i = C_{IN} \cdot \frac{BC_i}{BC_{TO}}.$$

This object is also realized by a device adapted to estimate the current datapacket rate $CCR_i$ of one connection out of a plurality of connections carrying datapackets via a multiplexed transmission channel in a communication network, characterised in that the device includes a buffer to store incoming datapackets of the connections, a register to store a first number representing the total number of datapackets stored in the buffer and a second number representing the number of datapackets of the connection stored in the buffer, datapacket rate measuring means for measuring the aggregate input datapacket rate of the buffer and calculating means for estimating the current datapacket rate via the equation:

$$CCR_i = C_{IN} \cdot \frac{BC_i}{BC_{TO}}.$$

Indeed by using the buffer to store incoming cells and by using the register means associated to this buffer to register the total number of cells $BC_{TO}$ stored in the buffer and for each connection the number of cells of that connection $BC_i$ stored in the buffer, and by measuring an aggregate input cell rate $C_{IN}$ of that buffer, the current cell rate $CCR_i$ of each connection is estimated with calculating means via the equation $$CCR_i = C_{IN} \cdot \frac{BC_i}{BC_{TO}} \tag{1}$$

It has to be remarked that in an environment which is already using a buffer no additional complex hardware with timers and registers has to be implemented by using this method to determine the current cell rate of a connection. Indeed, the available information in the register means associated with this buffer can be used and only the aggregate input cell rate of that buffer has to be measured to obtain all the factors used in formulae (1) to estimate the current cell rate.

A way of realizing the step of measuring an aggregate input datapackets rate of the buffer is to count the number of cells which enter the buffer during a predetermined period.

Since with each incoming cell or with each outgoing cell of the connections one of the factors of formulae (1) changes, the current cell rate $CCR_i$ can be estimated:

each time a cell comes in the buffer or;

each time a cell goes out the buffer or;

each time a cell comes in or goes out the buffer.

The invention also relates to a feedback mechanism for use in a communication network supporting a service such as the available bit rate service ABR in an asynchronous transfer mode ATM environment to share available bandwidth amongst a plurality of source nodes.

Such a feedback mechanism is known in the art e.g. as described in the draft version of the ATM Forum Traffic Management specification Version 4.0 with reference ATM Forum 95-0013R10 and published by Shirish S. Sathaye Fore Systems, Inc. 174 Thorn Hill Road Warrendale, Pa. 15086 on Feb. 5–9, 1996.

This document describes e.g. the way in which feedback flow of information is organised between N source nodes and a destination node and switching nodes along the communication path between the source nodes and the destination node. The N source nodes are competing for available bandwidth on a common link to a destination node. The source nodes regularly send resource management cells into the network which are reflected at the destination node and which are modified by the destination node and the switching nodes, called herein network elements. The resource management cells contain a set of information fields via which the source nodes communicate with the network elements in order to share the available bandwith i.e. to control the transmission rate of the different source nodes, called herein the current cell rate. As it is described on page 46 and 47 of the above mentioned specification one of the fields within the resource management cell, the current cell rate, is set by the source to its current allowed cell rate when it generates a resource management cell and may not be changed by the network elements but may be used by the feedback mechanism to facilitate the calculation of other fields in the resource management cell e.g. the explicit rate value which may be subsequently reduced by any network element and which is used to limit the source allowed cell rate to a specific value.

Since source-determined current cell rates may be inaccurate and fraudulent, the use of this information may lead to unfair allocation of the bandwidth and may be harmful for the network.

Therefore, a further object of the present invention is to provide a feedback mechanism as above described but which makes use of current cell rates which are not source-determined.

Due to the fact that the current cell rate is estimated by the feedback mechanism itself and that the switching node and destination node can use the above-described device which estimates the current cell rate, the current cell rate is not source determined.

Indeed, by including a buffer the current cell rate of a virtual connection is calculated via formulae (1) of the invention which includes the factors of the result of a measurement of an aggregate input cell rate of the buffer and the result of determining the total number of cells and the number of cells of the virtual connection stored in the buffer. So, the feedback mechanism makes use of a current cell rate which is not source-determined.

Since the ABR service category provides a low cell loss ratio and no commitments about cell transfer delay, an important dimension of the feedback mechanism is the buffer capacity. As mentioned on page 66 of the above mentioned specification, the management of the capacity of these buffers may range from a single first in first out queue to a more complex, multiple queue system with an algorithmically defined service rule that could operate based upon priorities. Taking into account the above mentioned remark and considering this environment, the use of the invention to estimate the current cell rate by using available information in the register means associated whit these buffers can be quite advantageous.

In a different implementation of the invention, still considering a feedback mechanism and in particular a feedback mechanism using the ratio of the current cell rate of a virtual connection and a value which is proportional to the aggregate input cell rate of buffer means which are similar to the buffer as described in the above paragraph, the present method may be simplified.

Such a feedback mechanism, based on an explicit rate feedback scheme which is using such a ratio is described on page 92 of the above mentioned specifications. The Explicit Rate Indication for Congestion Avoidance ERICA scheme uses an algorithm to compute the explicit rate based on the overload factor Z which is defined as the ratio of the input rate, similar to the aggregate input cell rate of the buffer means and the target rate $C_{TAR}$ of the buffer. The overload factor is thus a value which is proportional to the aggregate input cell rate $C_{IN}$ of buffer means. The target rate of the buffer is a function of the available output rate of the buffer. The global formulae which is used by the ERICA scheme goes beyond the scope of this invention. The aim is the use of the mentioned ratio to determine network feedback information such as the explicit rate value. In the ERICA scheme the expression, including the ratio, is given by the following equations:

$$ER_i = \frac{CCR_i}{Z} \quad (2)$$

with $$Z = \frac{C_{IN}}{C_{TAR}} \quad (3)$$

Therefore, a further object of the present invention is to provide a feedback mechanism as the above known one but which calculates said ratio without using source-determined information and without any additional measurement.

According to the invention, this further object is achieved in a feedback mechanism for use in a communication network supporting a service such as the available bit rate service (ABR) in an asynchronous transfer mode (ATM) environment, the communication network including N source nodes and a destination node between which a plurality of connections carrying datapackets via a multiplexed transmission channel are realised and including buffer means which are storing incoming datapackets of the connections, the feedback mechanism making use of the ratio of the current datapacket rate of one connection out of the plurality of connections and a value Z such as according to an overload factor of the buffer means which is proportional to the aggregate input datapacket rate of the buffer means to determine network feedback information for the connection such as for inclusion in a resource management datapacket, characterised in that the feedback mechanism calculates the ratio by performing the steps of storing in the buffer means incoming datapackets of the connections; determining the total number of datapackets in the buffer means; determining the number of datapackets of the connection in the buffer means; and calculating the ratio proportional to the number of datapackets of the connection and inversely proportional to the total number of datapackets.

This object is also achieved in a switching node included in a communication network for use by a service such as according to the available bit rate (ABR) service in an asynchronous transfer mode (ATM) environment, the communication network also including N source nodes and a destination node between which a plurality of connections carrying datapackets via a multiplexed transmission channel are realised, the switching node including buffer means to store incoming datapackets of the connections and including means to determine from the ratio of the current datapacket rate of one connection out of the plurality of connections and a value Z such as according to an overload factor of the buffer means which is proportional to the aggregate input datapacket rate of the buffer means, network feedback information for the connection such as for inclusion in a resource management datapacket, characterised in that the switching node includes a register to store a first number representing the total number of datapackets stored in the buffer means, and a second number representing the number of datapackets of the connection stored in the buffer means and calculating means to calculate the ratio proportional to the number of datapackets of the connection and inversely proportional to the total number of datapackets.

This object is still further achieved in a destination node included in a communication network for use by a service such as the available bit rate (ABR) service in an asynchronous transfer mode (ATM) environment, between N source nodes also included in the communication network and the destination node between which a plurality of connections carrying datapackets via a multiplexed transmission channel are realised, the destination node including buffer means to store incoming datapackets of the connections and including means to determine, from the ratio of the current datapacket rate of one connection out of the plurality of connections and a value Z such as according to an overload factor of the buffer means which is proportional to the aggregate input datapacket rate of the buffer means network, feedback information for the connection such as for inclusion in a resource management datapacket, characterised in that the destination node includes a register to store a first number representing the total number of datapackets stored in the buffer means and a second number representing the number of datapackets of the connection stored in the buffer means and calculating means to calculate the ratio proportional to the number of datapackets of the connection and inversely proportional to the total number of datapackets.

Indeed, taking into account that the buffer means of above mechanism constitutes the buffer used in the first described method and that when substituting equation (1) in equation (2), the factor of the aggregate input cell rate of the buffer appears in the numerator as well as in the denominator of the fraction, equation (2) can be simplified as follows:

$$ER_i = \frac{CCR_i}{Z} = \frac{C_{IN} \cdot \frac{BC_i}{BC_{TO}}}{\frac{C_{IN}}{C_{TAR}}} = \frac{BC_i}{BC_{TO}} \cdot C_{TAR} \quad (4)$$

So, the subject method is advantageously used in the ERICA scheme, since the ratio is calculated proportional to the total number of cells in the buffer and inversely proportional to the number of cells of the virtual connection in the buffer and no additional measurement has to be performed. Moreover, only available information in the register means associated with the buffer means is used.

BRIEF DESCRIPTION OF THE DRAWINGS

The above mentioned and other objects and features of the invention will become more apparent and the invention itself will be best understood by referring to the following description of an embodiment taken in conjunction with the accompanying drawing which shows a block scheme of an embodiment of a switching node wherein a device for estimating the current datapacket rate according to the present invention is used.

BEST MODE FOR CARRYING OUT THE INVENTION

Referring to the figure, the working of the switching node SN will be explained by means of a functional description of the blocks shown therein. Based on this description, implementation of the functional blocks will be obvious to a person skilled in the art and will therefore not be described in detail. In addition, the operating principle of the switching node SN regarding the invention will be described in further detail.

The switching node SN is included in a communication network and is used by an available bit rate service which is used in an asynchronous transfer mode environment. To situate and better explain the working of the switching node SN, out of N source nodes $S_1, \ldots, S_i, \ldots S_N$, and a destination node D which are also included in the communication network, especially $S_1, S_i, S_N$ and D are also shown in the figure.

The switching node SN includes a buffer B, registers REG associated to the buffer, cell rate measuring circuitry M and a calculating device CALC.

Between the N source nodes $S_1, \ldots, S_i, \ldots S_N$ and the destination node D a plurality of connections which are carrying cells and which are using a multiplexed transmission channel are established.

The N source nodes $S_1, \ldots, S_i, \ldots, S_N$ are sending cells to the destination node D at a current cell rate $CCR_1, \ldots, CCR_i, \ldots, CCR_N$ respectively and are competing for available bandwidth on the common link to this destination node D. A feedback mechanism is organised between the N source nodes $S_1, \ldots, S_i, \ldots, S_N$ and the network elements e.g. the destination node D and the switching node SN to provide, flow of feedback information to share the available, i.e. to control the transmission rate of the different source nodes $S_1, \ldots, S_i, \ldots, S_N$, called herein the current cell rate. Resource management cells are sent regularly by the N source nodes $S_1, \ldots, S_i, \ldots, S_N$ via the switching node SN to the destination node D and are returned by the destination node D again via the switching node SN back to their source. The resource management cells contain a set of information fields such as the current cell rate and the explicit rate value. Some of these information fields may be adjusted by the switching node or by the destination node according to the cited specification of the introduction to provide network information to the source. When a source sends a resource management cell, the current cell rate is supposed to be set to its current allowed cell rate and may not be changed by the network elements but may be used by the feedback mechanism to facilitate the calculation of e.g. the explicit rate value which may subsequently be reduced by any network element to limit the source to a source allowed specific cell rate. In this embodiment of the invention, instead of using the source-determined current cell rate, the current cell rate is estimated by the switching node SN itself.

The buffer B stores the incoming cells of the connections and the associated registers REG registrates a first number $BC_{TO}$ which represents the total number of cells which are stored in the buffer B and N numbers $BC_1, \ldots, BC_i, \ldots, BC_N$ which represent respectively the number of cells of the connections between the N source nodes $S_1, \ldots, S_i, \ldots, S_N$ and the destination node D which are stored at that same time in the buffer B.

It is to be clearly understood that the time interval during which the buffer B stores the different cells of the different connections goes beyond the scope of the invention and is no limitation on the invention.

The cell rate measuring circuitry M includes counters and clocking circuitry which are not shown in the figure in order not to overload the latter. The counters count the number of cells which enter the buffer B during a predetermined period which is determined by the clocking circuitry. In this way the cell rate measuring circuitry M measures the aggregate input cell rate $C_{IN}$ of the buffer B.

The calculating device CALC estimates the current cell rate $CCR_i$ of a connection between source $S_i$ and the destination node D via the equation:

$$CCR_i = C_{IN} \cdot \frac{BC_i}{BC_{TO}} \quad (1)$$

A second embodiment similar to the first embodiment represents a switching node wherein a simplified device to estimate the current cell rate according to the present invention is used.

The operation of the second embodiment is similar to the description of the working of the first embodiment in the previous paragraphs. However, the difference with this embodiment is that the measuring circuitry M is not included any more. Why this measuring circuitry M can be left out will be explained in the following paragraphs.

In this second embodiment the switching node is using the ratio of the current cell rate and a value which is proportional to the aggregate input cell rate $C_{IN}$ of buffer means included in the switching node to facilitate the calculation of the explicit rate value.

As explained in the introduction, the Explicit Rate Indication for Congestion Avoidance i.e. ERICA scheme uses an algorithm to compute the explicit rate based on the overload factor Z of the buffer means. The overload factor Z of the buffer means is defined as the ratio of the aggregate input rate $C_{IN}$ of the buffer means and the target rate $C_{TAR}$ of the buffer means i.e. proportional to the aggregate input cell rate $C_{IN}$ of the buffer means. Furthermore the ERICA scheme includes an expression given by the equation $$ER_i = \frac{CCR_i}{Z}$$

with $$Z = \frac{C_{IN}}{C_{TAR}} ;$$

i.e. the use of the mentioned ratio to determine network feedback information i.e. explicit rate $ER_i$ value of the connection between the source $S_i$ and the destination node D.

It has to be remarked that the target rate $C_{TAR}$ of the buffer is a function of the predetermined output rate of the buffer and has no influence on the scope of the invention.

The mentioned ratio is determined by using for the current cell rate the formulae of the invention, taking into account that the buffer means of above constitutes the buffer B used in the method of the invention and by simplifying the fraction since the factor of the aggregate input cell rate of the buffer B is included in both the numerator and the denominator of the equation:

$$ER_i = \frac{CCR_i}{Z} = \frac{C_{IN} \cdot \frac{BC_i}{BC_{TO}}}{\frac{C_{IN}}{C_{TAR}}} = \frac{BC_i}{BC_{TO}} \cdot C_{TAR}$$

The result is proportional to the total number of cells in the buffer B and inversely proportional to the number of cells of the connection in the buffer B; i.e. the available information in the associated registers REG is used and no additional measurement has to be performed which means that in this second embodiment the cell rate measuring circuitry M is not necessary.

It should be noted that the present invention is used on the assumption that the buffer is not empty, which means that the formulae of the invention returns a finite number. In an ABR environment, the present buffers are used to absorb an excess traffic of cells of the different source nodes. In such a situation the buffer is not empty. However when the buffer is empty e.g. when no excess traffic occurs and the buffer was already empty, the factors $BC_i$ and $BC_{TO}$ equal to zero and the fraction is undetermined. This has to be taken into account in the feedback mechanism by e.g. providing at least a small delay to the incoming cells or by returning in such a situation a predetermined finite value to the estimated current cell rate $CCR_i$, e.g. the negotiated minimum cell rate which is guaranteed to the source node, or to the estimated ratio of the current cell rate CCRi and the Z value .

Moreover it should be noted that, although the above described network is an ATM network with ABR sources and ABR destinations, the application of the present invention is not limited to the field of ABR or ATM. Small modifications, evident to a person skilled in the art, may be applied to the above described embodiment to adapt it to be integrated in other networks wherein rather delay-insensitive, bursty data packets are transmitted from source nodes to destination nodes via buffer means and wherein the feedback loop allows network nodes to control the current cell rate of the source nodes. For instance the present invention is applicable to LAN (Local Area Network) or computer networks or in an ATM network which supports service classes such as the VBR+ (Variable Bit Rate Plus) class.

While the principles of the invention have been described above in connection with specific apparatus, it is to be clearly understood that this description is made only by way of example and not as a limitation on the scope of the invention.

What is claimed is:

1. A method of estimating, in a node (SN) of a communication network, the current datapacket rate CCRi of one out of a plurality of connections passing through or arriving at said node (SN) and carrying datapackets transmitted via a multiplexed transmission channel in said communication network wherein said method comprises the steps of:

a) storing in a buffer (B) of said node (SN) incoming datapackets of said connections;

b) determining the total number of datapackets $BC_{TO}$ in said buffer (B);

c) determining the number of datapackets of said connection $BC_i$ in said buffer (B);

d) measuring an aggregate input datapacket rate $C_{IN}$ of said buffer (B); and e) estimating said current datapacket rate $CCR_i$, via the equation:

$$CCR_i = C_{IN} \cdot \frac{BC_i}{BC_{TO}} .$$

2. A method according to claim 1, wherein step d of said method is implemented by counting the number of datapackets which enter said buffer (B) during a predetermined period.

3. A method according to claim 1, characterised in that said current datapacket rate $CCR_i$ of said connection is estimated:

each time a datapacket comes in said buffer (B); or each time a datapacket goes out said buffer (B); or each time a datapacket comes in or goes out said buffer (B).

4. A feedback mechanism for use in a communication network supporting services including the available bit rate service (ABR) in an asynchronous transfer mode (ATM) environment, said communication network including N source nodes ($S_1, \ldots, S_i, \ldots, S_N$) and a destination node (D) between which a plurality of connections carrying datapackets via a multiplexed transmission channel are established, said feedback mechanism making use of the current datapacket rate $CCR_i$ of one connection out of said plurality of connections to determine network feedback information for said connection usable in a resource management datapacket (RM), and wherein said feedback mechanism estimates said current datapacket rate $CCR_i$ by performing the steps of:

a) storing in a buffer (B) of said node (SN) incoming datapackets of said connections;

b) determining the total number of datapackets $BC_{TO}$ in said buffer (B);

c) determining the number of datapackets of said connection $BC_i$ in said buffer (B);

d) measuring an aggregate input datapacket rate $C_{IN}$ of said buffer (B); and e) estimating said current datapacket rate $CCR_i$, via the equation:

$$CCR_i = C_{IN} \cdot \frac{BC_i}{BC_{TO}}.$$

5. A feedback mechanism for use in a communication network supporting services including the available bit rate service (ABR) in an asynchronous transfer mode (ATM) environment, said communication network including N source nodes ($S_1, \ldots, S_i, \ldots, S_N$) and a destination node (D) between which a plurality of connections carrying datapackets via a multiplexed transmission channel are realised and including buffer means which are storing incoming datapackets of said connections, said feedback mechanism making use of the ratio of the current datapacket rate $CCR_i$ of one connection out of said plurality of connections and a value Z representing an overload factor of said buffer means which is proportional to the aggregate input datapacket rate $C_{IN}$ of said buffer means to determine network feedback information for said connection usable in a resource management datapacket (RM), characterised in that said feedback mechanism calculates said ratio by performing the steps of:

a) storing in said buffer means incoming datapackets of said connections;
   b) determining the total number of datapackets $BC_{TO}$ in said buffer means;
   c) determining the number of datapackets of said connection $BC_i$ in said buffer means; and
   calculating said ratio proportional to said number of datapackets of said connection $BC_i$, and inversely proportional to said total number of datapackets $BC_{TO}$.

6. A device adapted to estimate the current datapacket rate $CCR_i$ of one connection out of a plurality of connections carrying datapackets via a multiplexed transmission channel in a communication network characterised in that said device includes a buffer (B) to store incoming datapackets of said connections, register means (REG) to register a first number $BC_{TO}$ representing the total number of datapackets stored in said buffer (B) and a second number $BC_i$ representing the number of datapackets of said connection stored in said buffer (B), datapacket rate measuring means (M) for measuring the aggregate input datapacket rate $C_{IN}$ of said buffer (B) and calculating means (CALC) for estimating said current datapacket rate $CCR_i$ via the formulae:

$$CCR_i = C_{IN} \cdot \frac{BC_i}{BC_{TO}}.$$

7. A device adapted to estimate the current datapacket rate $CCR_i$, according to claim 6, characterised in that said measuring means (M) includes counter means to count the number of datapackets which enter said buffer (B) during a predetermined period and clock means to determine said predetermined period.

8. A switching node (SN) included in a communication network for use by services including according to the available bit rate (ABR) service in an asynchronous transfer mode (ATM) environment, said communication network also including N source nodes ($S_1, \ldots, S_i, \ldots, S_N$) and a destination node (D) between which a plurality of connections carrying datapackets via a multiplexed transmission channel are realised, said switching node (SN) including means to determine from the current datapacket rate $CCR_i$ of one connection out of said plurality of connections, network feedback information for said connection usable in a resource management datapacket (RM) and characterised in that said switching node (SN) includes a device adapted to estimate the current datapacket rate $CCR_i$, of one connection out of a plurality of connections carrying datapackets via a multiplexed transmission channel in a communication network, and further characterised in that said device includes a buffer (B) to store incoming datapackets of said connections, register means (REG) to register a first number $BC_{TO}$ representing the total number of datapackets stored in said buffer (B) and a second number $BC_i$ representing the number of datapackets of said connection stored in said buffer (B), datapacket rate measuring means (M) for measuring the aggregate input datapacket rate $C_{IN}$ of said buffer (B) and calculating means (CALC) for estimating said current datapacket rate $CCR_i$ via the equation:

$$CCR_i = C_{IN} \cdot \frac{BC_i}{BC_{TO}}.$$

9. A switching node (SN) according to claim 8, further characterized in that said measuring means (M) includes counter means to count the number of datapackets which enter said buffer (B) during a predetermined period and clock means to determine said predetermined period.

10. A switching node (SN) included in a communication network for use by services including according to the available bit rate (ABR) service in an asynchronous transfer mode (ATM) environment, said communication network also including N source nodes ($S_1, \ldots, S_i, \ldots, S_N$) and a destination node (D) between which a plurality of connections carrying datapackets via a multiplexed transmission channel are realised, said switching node (SN) including buffer means to store incoming datapackets of said connections and including means to determine from the ratio of the current datapacket rate $CCR_i$ of one connection out of said plurality of connections and a value Z such as representing an overload factor of said buffer means which is proportional to the aggregate input datapacket rate ($C_{IN}$) of said buffer means, network feedback information for said connection usable in a resource management datapacket (RM), characterised in that said switching node (SN) includes register means (REG) to register a first number $BC_{TO}$ representing the total number of datapackets stored in said buffer means, and a second number $BC_i$ representing the number of datapackets of said connection stored in said buffer means and calculating means (CALC) to calculate said ratio proportional to said number of datapackets of said connection $BC_i$ and inversely proportional to said total number of datapackets $BC_{TO}$.

11. A destination node (D) included in a communication network for use by services including the available bit rate (ABR) in an asynchronous transfer mode (ATM) environment, between N source nodes also included in said communication network and said destination node (D) a plurality of connections carrying datapackets via a multiplexed transmission channel are realised, said destination node (D) including means to determine from the current datapacket rate $CCR_i$, of one connection out of said plurality of connections to determine network feedback information for said connection usable in a resource management datapacket (RM), characterised in that said destination node (D) includes a device adapted to estimate the current datapacket rate $CCR_i$, of one connection out of a plurality of connections carrying datapackets via a multiplexed transmission channel in a communication network, and further characterised in that said device includes a buffer (B) to store incoming datapackets of said connections, register means (REG) to register a first number $BC_{TO}$ representing the total number of datapackets stored in said buffer (B) and a second number $BC_i$ representing the number of datapackets of said connection stored in said buffer (B), datapacket rate measuring means (M) for measuring the aggregate input datapacket rate $C_{IN}$ of said buffer (B) and calculating means (CALC) for estimating said current datapacket rate $CCR_i$ via the equation:

$$CCR_i = C_{IN} \cdot \frac{BC_i}{BC_{TO}}.$$

12. A destination node (D) according to claim 11, further characterized in that said measuring means (M) includes counter means to count the number of datapackets which enter said buffer (B) during a predetermined period and clock means to determine said predetermined period.

13. A destination node (D) included in a communication network for use by services including the available bit rate (ABR) service in an asynchronous transfer mode (ATM) environment, between N source nodes also included in said communication network and said destination node (D) between which a plurality of connections carrying datapackets via a multiplexed transmission channel are realised, said destination node (D) including buffer means to store incoming datapackets of said connections and including means to determine, from the ratio of the current datapacket rate $CCR_i$ of one connection out of said plurality of connections and a value Z representing an overload factor of said buffer means which is proportional to the aggregate input datapacket rate ($C_{IN}$) of said buffer means network, feedback information for said connection usable in a resource management datapacket (RM), characterised in that said destination node (D) includes register means (REG) to register a first number $BC_{TO}$ representing the total number of datapackets stored in said buffer means and a second number $BC_i$ representing the number of datapackets of said connection stored in said buffer means and calculating means (CALC) to calculate said ratio proportional to said number of datapackets of said connection $BC_i$ and inversely proportional to said total number of datapackets $BC_{TO}$.

* * * * *

UNITED STATES PATENT AND TRADEMARK OFFICE
CERTIFICATE OF CORRECTION

PATENT NO. : 5,848,056
DATED : Dec. 8, 1998
INVENTOR(S) : Meurisse et al.

It is certified that error appears in the above-identified patent and that said Letters Patent is hereby corrected as shown below:

In column 10, line 35 "such as" should be deleted.

Signed and Sealed this

Twentieth Day of April, 1999

Attest:

Q. TODD DICKINSON

*Attesting Officer*    *Acting Commissioner of Patents and Trademarks*